United States Patent
Bosworth et al.

(10) Patent No.: US 11,530,032 B2
(45) Date of Patent: Dec. 20, 2022

(54) DYNAMICALLY ISOLATED PYLON

(71) Applicant: Bell Textron Inc., Fort Worth, TX (US)

(72) Inventors: Jeffrey Bosworth, Argyle, TX (US);
Robert Veltre, Irving, TX (US)

(73) Assignee: Textron Innovations Inc., Providence, RI (US)

(*) Notice: Subject to any disclaimer, the term of this patent is extended or adjusted under 35 U.S.C. 154(b) by 546 days.

(21) Appl. No.: 16/588,097

(22) Filed: Sep. 30, 2019

(65) Prior Publication Data
US 2021/0094676 A1    Apr. 1, 2021

(51) Int. Cl.
F16F 13/08    (2006.01)
B64C 27/00    (2006.01)
B64C 29/00    (2006.01)

(52) U.S. Cl.
CPC ........ B64C 27/001 (2013.01); B64C 29/0033 (2013.01); B64C 2027/002 (2013.01)

(58) Field of Classification Search
CPC ........ B64C 27/001; B64C 27/51; F16F 13/08; F16F 13/24
USPC .......... 188/267, 378, 379; 267/136, 267/141.1–141.3; 244/17.11, 17.13, 244/17.27
See application file for complete search history.

(56) References Cited

U.S. PATENT DOCUMENTS

| | | | |
|---|---|---|---|
| 4,236,607 A | 12/1980 | Halwes et al. | |
| 5,788,029 A * | 8/1998 | Smith | F16F 15/02 188/297 |
| 6,431,530 B1 * | 8/2002 | Stamps | B64C 27/001 267/293 |
| 8,622,375 B2 | 1/2014 | Bosworth et al. | |
| 8,731,743 B2 * | 5/2014 | Seifert | F16F 13/24 703/2 |
| 8,840,062 B2 | 9/2014 | Smith et al. | |
| 9,249,856 B1 * | 2/2016 | Lee | B64C 27/001 |
| 9,297,438 B2 * | 3/2016 | Meacham | F16F 15/131 |
| 9,551,393 B2 | 1/2017 | Smith et al. | |
| 9,765,641 B2 * | 9/2017 | Smith | F16F 13/08 |
| 10,330,166 B2 | 6/2019 | Lee et al. | |
| 2016/0083088 A1 * | 3/2016 | Heverly, II | B64C 27/51 416/106 |
| 2016/0280363 A1 * | 9/2016 | Heverly, II | B64C 27/001 |
| 2018/0099757 A1 | 4/2018 | Williams et al. | |
| 2018/0099759 A1 | 4/2018 | Kooiman et al. | |

* cited by examiner

Primary Examiner — Christopher P Schwartz
(74) Attorney, Agent, or Firm — Shackelford, Bowen, McKinley & Norton, LLP

(57) ABSTRACT

An exemplary tiltrotor aircraft includes a fuselage carrying a wing, a pylon assembly coupled to the wing such that the pylon assembly is rotatable to selectively operate the tiltrotor aircraft between a helicopter mode and an airplane mode, a vibration isolator assembly connected to the pylon assembly and the wing including a first vibration isolator configured to isolate vibration in a vertical plane a second vibration isolator configured to isolate vibration in a lateral plane.

18 Claims, 10 Drawing Sheets

DYNAMICALLY ISOLATED PYLON

TECHNICAL FIELD

This specification relates in general to the field of vibration isolation and in particular to a vibration isolator incorporating fluid and elastomeric elements to effectively eliminate the transmission of certain vibration frequencies into structural components.

BACKGROUND

This section provides background information to facilitate a better understanding of the various aspects of the disclosure. It should be understood that the statements in this section of this document are to be read in this light, and not as admissions of prior art.

For many years, effort has been directed toward the design of an apparatus for preventing the transmission of vibration from one vibrating body to another body. Such devices are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements to adjust the frequency response characteristics of the overall system to achieve acceptable levels of vibration in the structures of interest in the system. One field in which these isolators find a great deal of use is in aircraft, wherein vibration isolation systems are utilized to isolate the fuselage or other portions of an aircraft from mechanical vibrations which are associated with the propulsion system and which are generated by the engine, transmission, propellers, rotors, or proprotors of the aircraft.

Vibration isolators are distinguishable from damping devices although damping devices are often erroneously referred to as isolators. As an illustration, a simple force equation for vibration is set forth as follows $m\ddot{x}+c\dot{x}+kx=F$.

A true vibration isolator utilizes acceleration of a fluid body ($m\ddot{x}$) to cancel the displacement of vibration ($kx$). In contrast, a damping device is concerned with restricting flow of a fluid or other body and thus velocity ($c\dot{x}$), and does not cancel vibration, but merely absorbs its energy.

Minimization of the length, weight and overall size of the isolation device is an important consideration in the design of an aircraft vibration isolation system. This minimization is particularly important in the design and manufacture of helicopters, which are required to hover against the dead weight of the craft and which are in many ways more constrained in their payload than fixed wing aircraft.

A marked improvement in the field of vibration isolation, particularly as applied to aircraft and helicopters, was disclosed in commonly assigned U.S. Pat. No. 4,236,607, entitled "Vibration Suppression System," issued Dec. 2, 1980 to Halwes, et al., and which is incorporated herein by reference. This patent discloses a vibration isolator in which a dense, low-viscosity fluid is used as the "tuning" mass to counterbalance and cancel oscillating forces transmitted through the isolator. This isolator employs the principle that the acceleration of an oscillating mass is 180 degrees out of phase with its displacement to cancel the transmission of undesirable motion.

Halwes, et al. recognized that the inertial characteristics of a dense, low-viscosity fluid, combined with a hydraulic advantage resulting from a piston arrangement, could harness the out-of-phase acceleration to generate counter-balancing forces to attenuate or cancel vibration.

SUMMARY

An exemplary vibration isolator assembly for connecting a first body and a second body includes a first vibration isolator configured to isolate vibration in a first plane and a second vibration isolator configured to isolate vibration in a second plane. Exemplary first and second vibration isolators are liquid inertial vibration eliminators. In an exemplary embodiment, the first vibration isolator is tuned to eliminate a first frequency and the second vibration isolator is tuned to eliminate a second frequency.

An exemplary tiltrotor aircraft includes a fuselage carrying a wing, a pylon assembly coupled to the wing such that the pylon assembly is rotatable to selectively operate the tiltrotor aircraft between a helicopter mode and an airplane mode, a vibration isolator assembly connected to the pylon assembly and the wing including a first vibration isolator configured to isolate vibration in a vertical plane a second vibration isolator configured to isolate vibration in a lateral plane.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
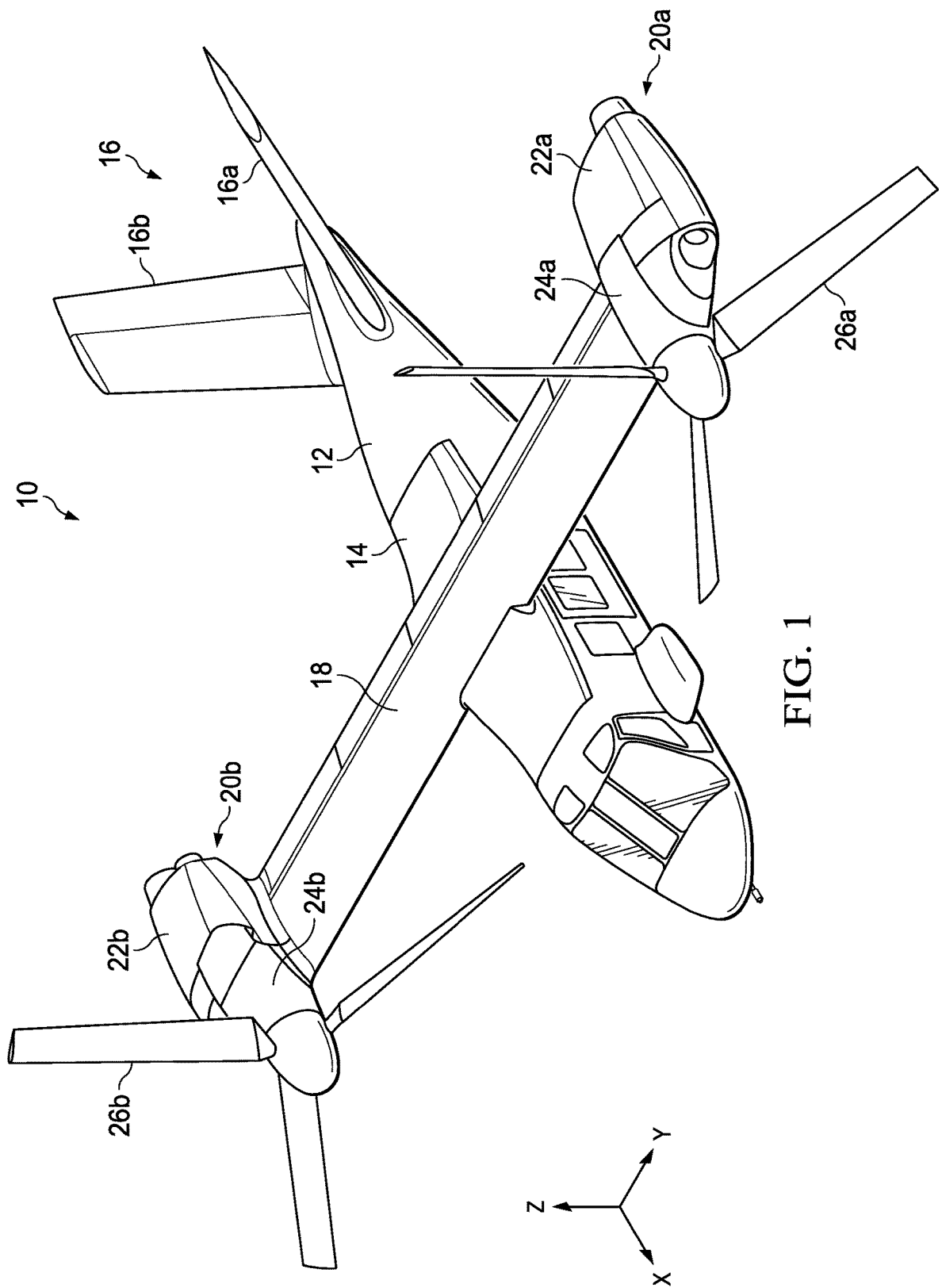
FIGS. 1 and 3 illustrate an exemplary tiltrotor aircraft in airplane mode.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIG. 1 depicts three mutually orthogonal directions X, Y, and Z forming a three-dimensional frame of reference XYZ. Longitudinal axis X corresponds to the roll axis that extends through the center of aircraft 10 in the fore and after directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

Figure 2:
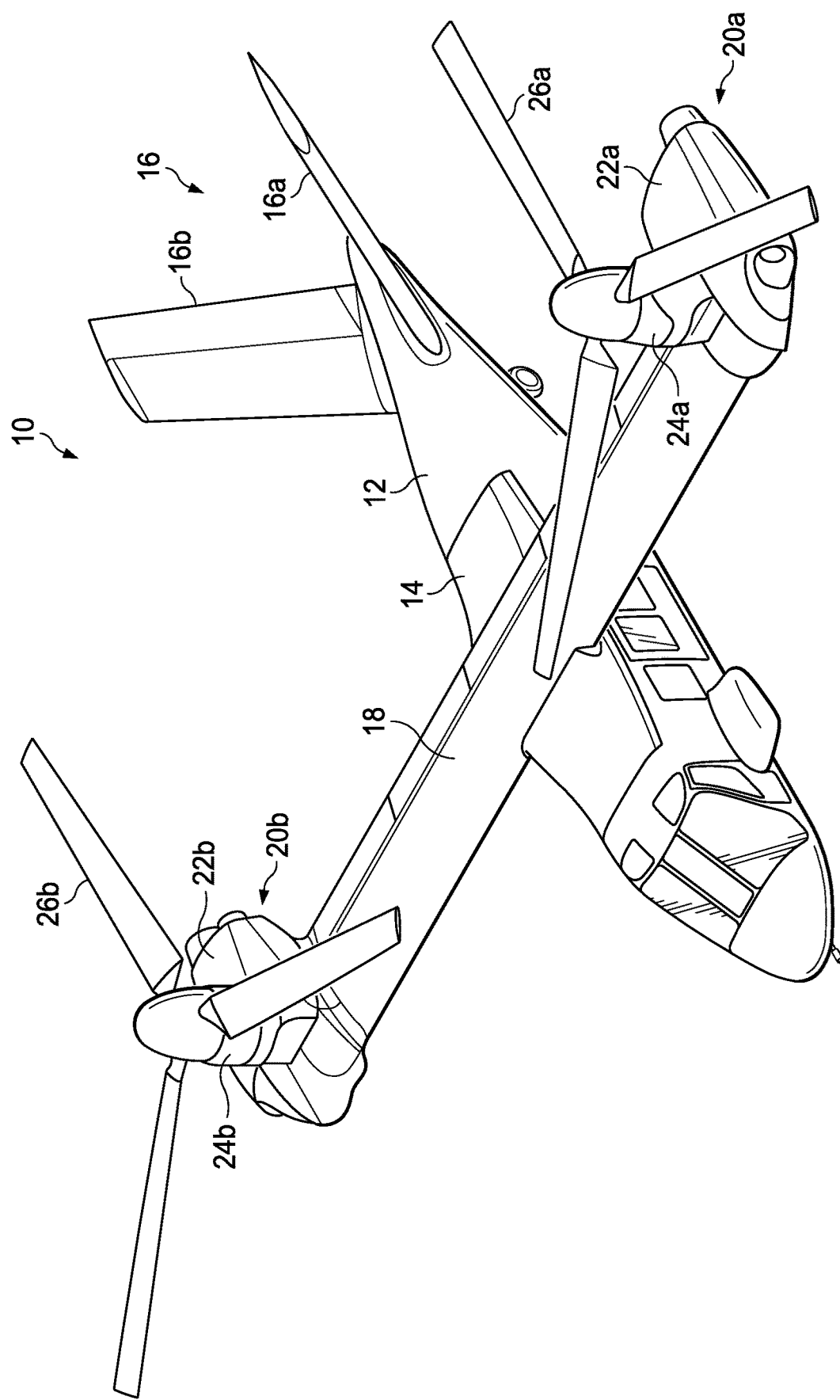
FIG. 2 illustrates an exemplary tiltrotor aircraft in helicopter mode.
Figure 3:
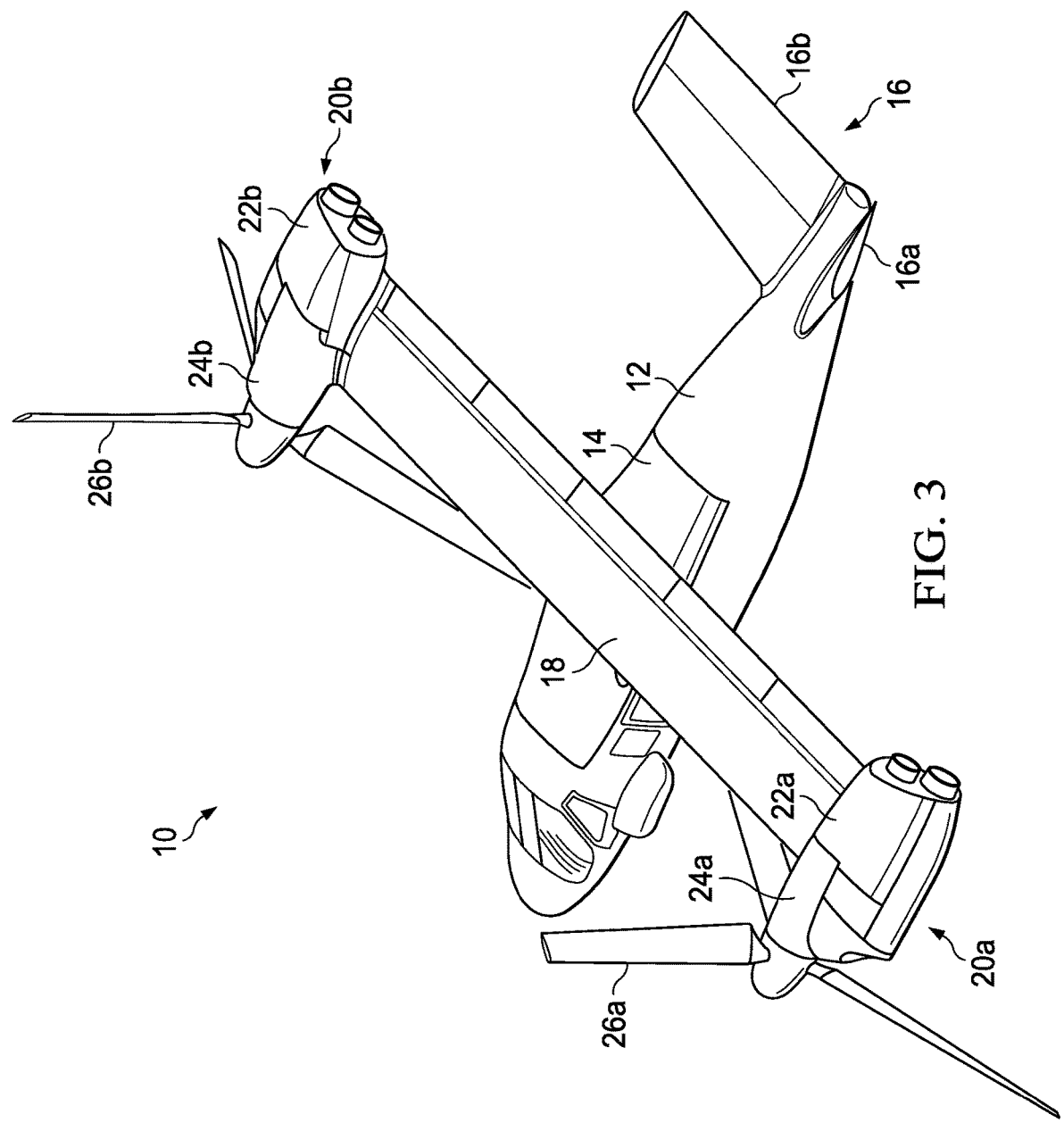

Referring to FIGS. 1-3 in the drawings, a tiltrotor aircraft is schematically illustrated and generally designated 10. Aircraft 10 includes a fuselage 12, a wing mount assembly 14 that is rotatable relative to fuselage 12 and a tail assembly 16 including rotatable mounted tail members 16a, 16b having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are propulsion assemblies 20a, 20b. Propulsion assembly 20a includes a fixed nacelle 22a that houses an engine and a fixed portion of the drive system. In addition, propulsion assembly 20a includes a pylon assembly 24a that is positioned inboard of fixed nacelle 22a and above wing 18. Pylon assembly 24a is rotatable relative to fixed nacelle 22a and wing 18 between a generally horizontal orientation, as best seen in FIG. 1, and a generally vertical orientation, as best seen in FIG. 2. Pylon assembly 24a includes a rotatable portion of the drive system and a proprotor assembly 26a that is rotatable responsive to torque and rotational energy provided via the engine and drive system. Likewise, propulsion assembly 20b includes a fixed nacelle 22b that houses an engine and a fixed portion of the drive system. In addition, propulsion assembly 20b includes a pylon assembly 24b that is positioned inboard of fixed nacelle 22b and above wing 18. Pylon assembly 24b is rotatable relative to fixed nacelle 22b and wing 18 between a generally horizontal orientation, as best seen in FIG. 1, a generally vertical orientation, as best seen in FIG. 2. Pylon assembly 24b includes a rotatable portion of the drive system and a proprotor assembly 26b that is rotatable responsive to torque and rotational energy provided via the engine and drive system.

FIGS. 1 and 3 illustrate aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. FIG. 2 illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. It should be appreciated that aircraft 10 can be operated such that proprotor assemblies 26a, 26b are selectively positioned between airplane mode and helicopter mode, which can be referred to as a conversion flight mode. Even though aircraft 10 has been described as having one engine in each fixed nacelle 22a, 22b, it should be understood by those having ordinary skill in the art that other propulsion system arrangements are possible and are considered to be within the scope of the present disclosure including, for example, having a single engine which may be housed within one of the fixed nacelles or within the fuselage that provides torque and rotational energy to both proprotor assemblies 26a, 26b.

During all flight modes, proprotor assemblies 26a, 26b rotate in opposite directions to provide torque balancing to aircraft 10. For example, when viewed from the front of aircraft 10 in forward flight mode, proprotor assembly 26a rotates clockwise and proprotor assembly 26b rotates counterclockwise. In the illustrated embodiment, proprotor assemblies 26a, 26b each include three twisted proprotor blades that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. Further, it should be understood by those having ordinary skill in the art that even though propulsion systems 20a, 20b are illustrated in the context of tiltrotor aircraft 10, the propulsion systems of the present disclosure can be implemented on other types of tiltrotor aircraft including, for example, quad tiltrotor aircraft and unmanned tiltrotor aircraft, to name a few.

Referring now to FIGS. 4-8, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Propulsion system 20a includes an engine 30 that is fixed relative to wing 18. An engine output shaft 32 transfers power from engine 30 to a spiral bevel gearbox 34 that includes spiral bevel gears to change torque direction by 90 degrees from engine 30 to a fixed gearbox 36. Fixed gearbox 36 includes a plurality of gears, such as helical gears, in a gear train that are coupled to an interconnect drive shaft 38 and a common shaft depicted as quill shaft 40. Torque is transferred to an input gear 42 in spindle gearbox 44 of proprotor gearbox 46 through quill shaft 40.

Figure 8:
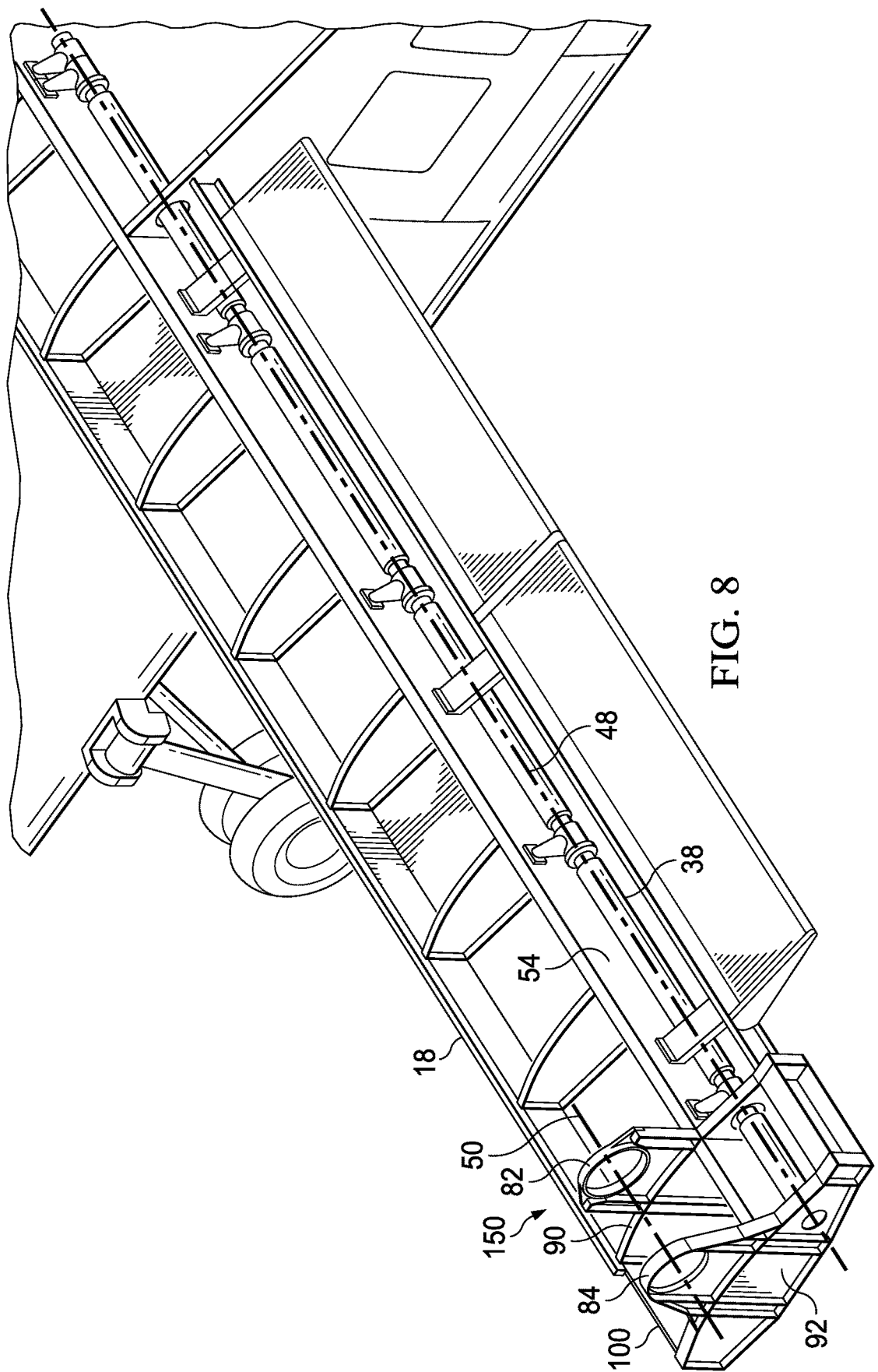
FIG. 8 illustrates an exemplary wing section of a tiltrotor aircraft.

Interconnect drive shaft 38 provides a torque path that enables a single engine to provide torque to both proprotors assemblies 26a, 26b in the event of a failure of the other engine. In the illustrated embodiment, interconnect drive shaft 38 has a rotational axis 48 that is vertically lower and horizontally aft of a longitudinal axis of the spindle gearbox 44 referred to herein as a conversion axis 50. Conversion axis 50 is parallel to a lengthwise axis 52 of wing 18. Referring in particular to FIG. 8, interconnect drive shaft 38 includes a plurality of segments that share rotational axis 48. Locating interconnect drive shaft 38 aft of wing spar 54, which is a structural member of the airframe of tiltrotor aircraft 10, provides for optimal integration with fixed gearbox 36 without interfering with the primary torque transfer of quill shaft 40 between fixed gearbox 36 and spindle gearbox 44. Conversion axis 50 of spindle gearbox 44 is parallel to rotational axis 48 of interconnect drive shaft 38 but located forward and above rotational axis 48.

Figure 4:
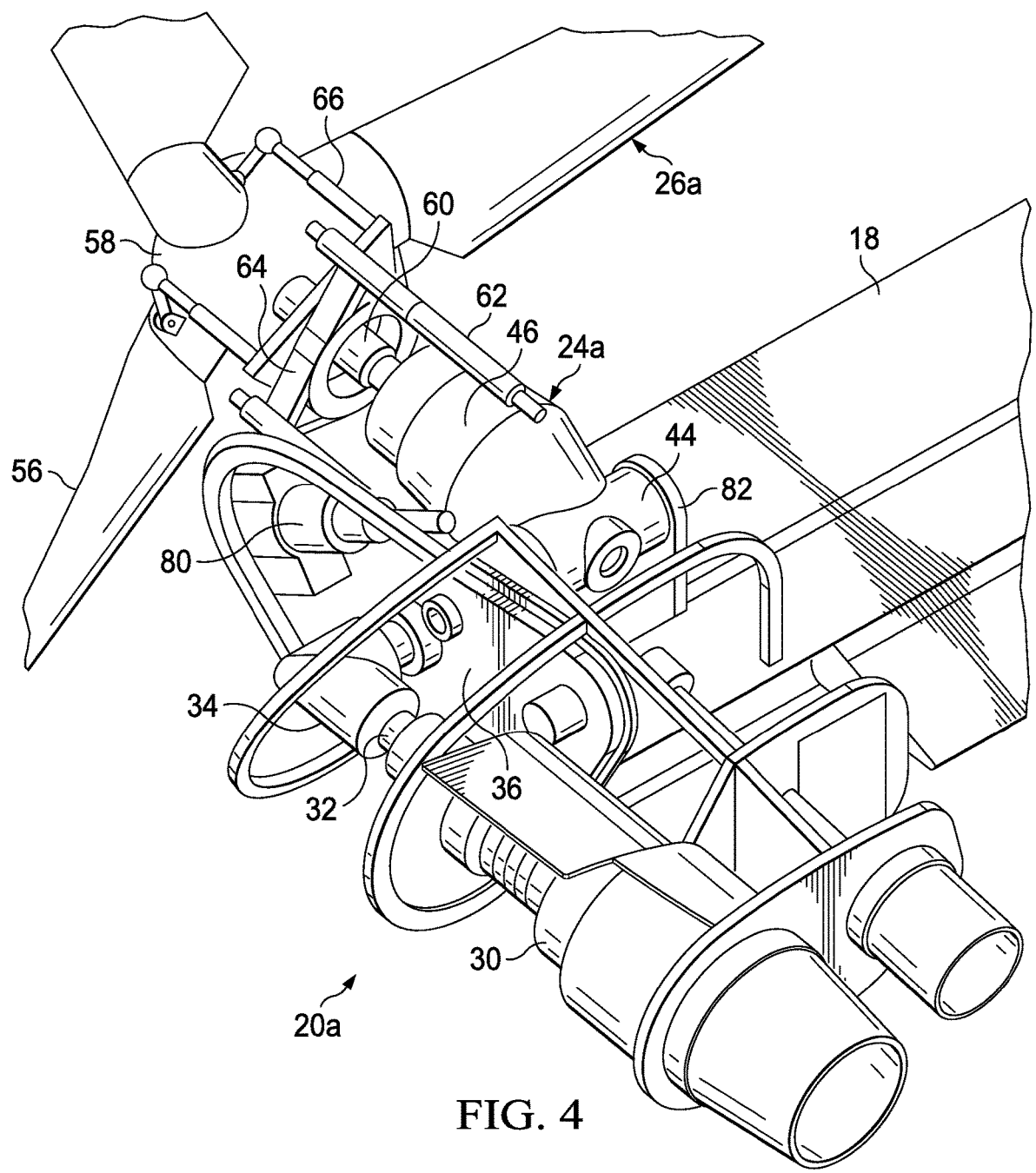
FIG. 4 illustrates an exemplary propulsion system of a tiltrotor aircraft.

As best seen in FIG. 4, proprotor assembly 26a of propulsion system 20a includes a plurality of proprotor blades 56 coupled to a yoke 58 that is coupled to a mast 60. Mast 60 is coupled to proprotor gearbox 46. The collective and/or cyclic pitch of proprotor blades 56 may be controlled responsive to pilot input via actuators 62, swashplate 64 and pitch links 66.

Figure 5:
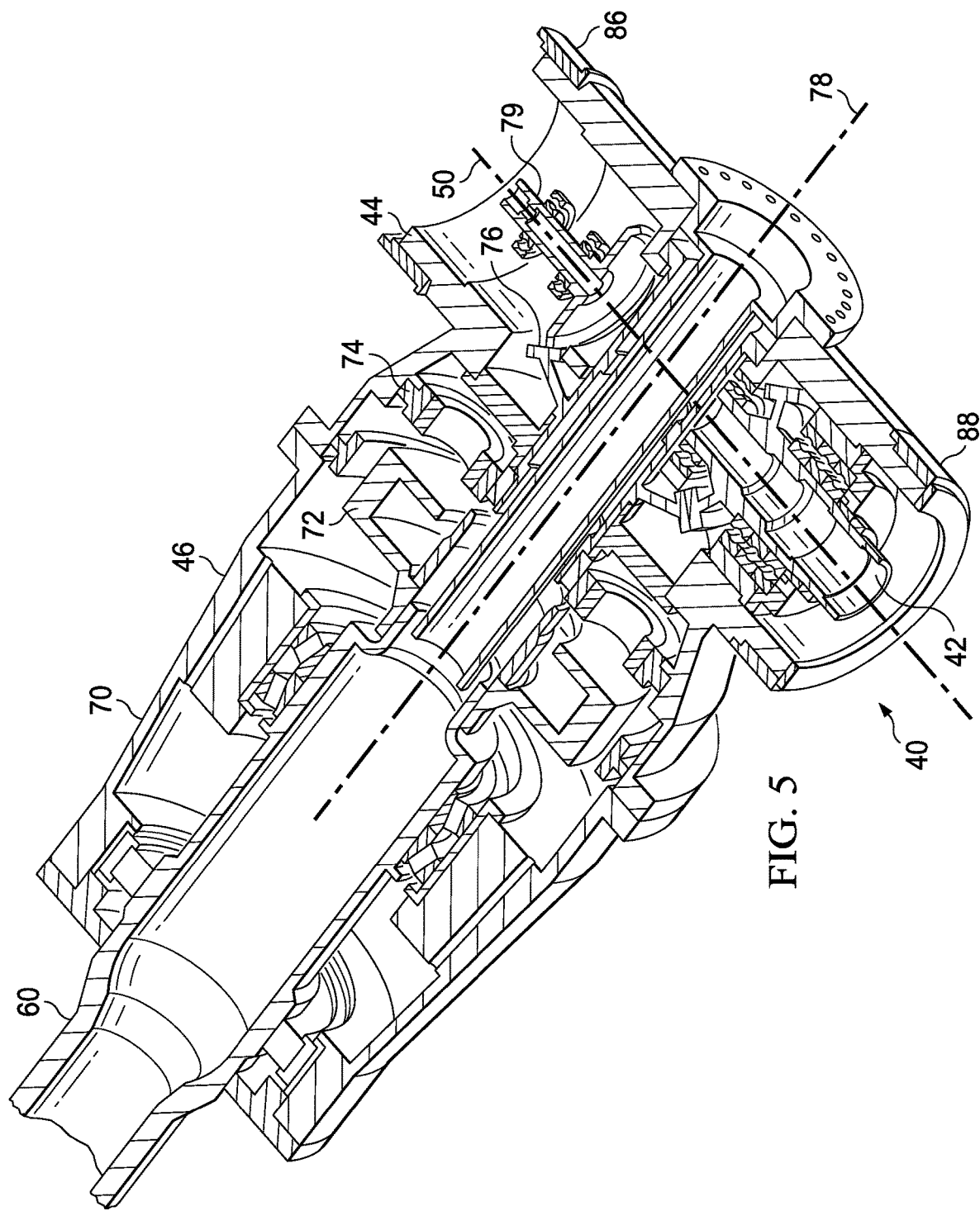
FIG. 5 illustrates an exemplary pylon assembly a tiltrotor aircraft.
Figure 6:
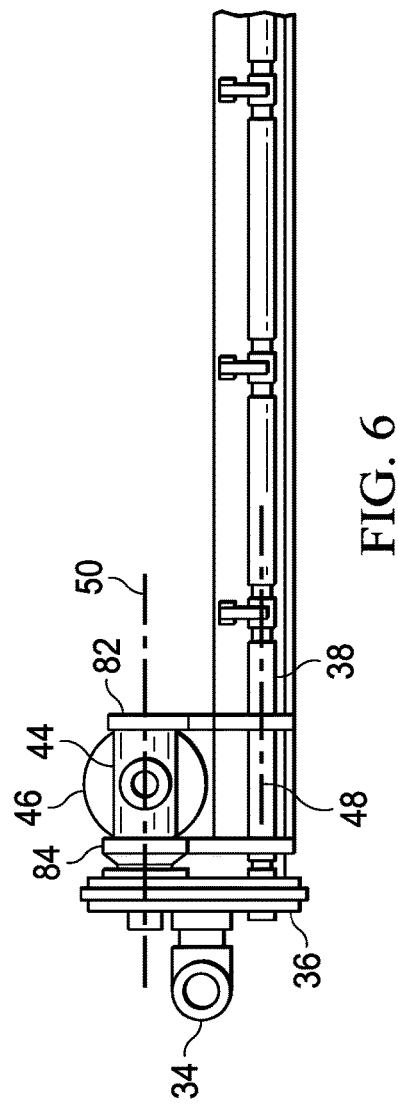
FIG. 6 illustrates an aft view of an exemplary propulsion system and wing section of a tiltrotor aircraft.
Figure 7:
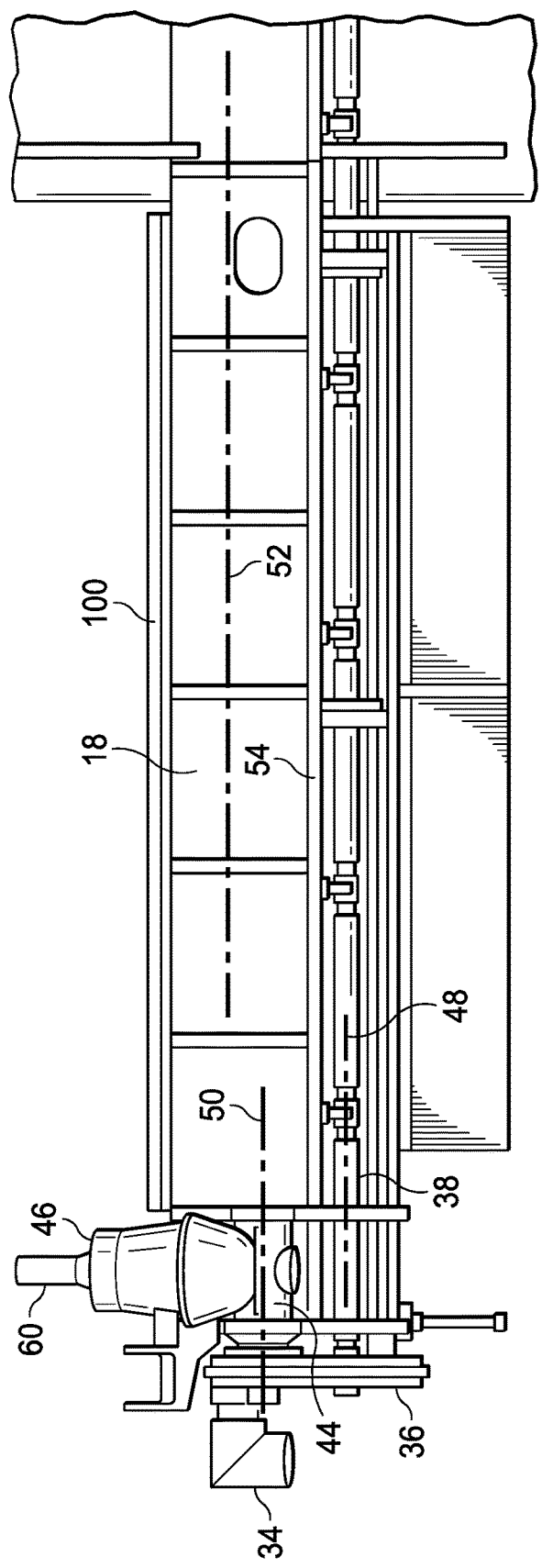
FIG. 7 illustrates a top view of an exemplary propulsion system and wing section of a tiltrotor aircraft.

Referring in particular to FIG. 5, proprotor gearbox 46 is configured to transfer power and reduce speed to mast 60. Proprotor gearbox 46 includes a top case portion 70 and spindle gearbox 44. Speed reduction is accomplished by a low speed planetary gear assembly 72 and a high speed planetary gear assembly 74. A spiral bevel gear assembly includes spiral bevel input gear 42 and a spiral bevel output gear 76. The spiral bevel gear assembly changes power direction from along longitudinal axis 50 of spiral bevel input gear 42 to a centerline axis 78 of spiral bevel output gear 76. An accessory drive 79 can be coupled to spiral bevel output gear 76. It should be appreciated that proprotor gearbox 46 can include additional or different components including bearing systems, lubrication systems and other gearbox related systems that may be beneficial for operation.

During operation, a conversion actuator 80, as best seen in FIG. 4, can be actuated so as to selectively rotate proprotor gearbox 46 and thus pylon assembly 24a about conversion axis 50, which in turn selectively positions proprotor assembly 26a between helicopter mode, as best seen in FIG. 2, and airplane mode, as best seen in FIGS. 1 and 3. The operational loads, such as thrust loads, are transmitted through mast 60 and into spindle gearbox 44 of proprotor gearbox 46 and thus the structural support of spindle gearbox 44 is critical. In the illustrated embodiment, spindle gearbox 44 is rotatably coupled to the airframe of tiltrotor aircraft 10 by mounting spindle gearbox 44 to an inboard pedestal depicted as inboard pillow block 82 having an inboard bearing assembly 86 and an outboard pedestal depicted as outboard pillow block 84 with an outboard bearing assembly 88. Thus, spindle gearbox 44 is structurally supported and is operable to be rotated about conversion axis 50 by conversion actuator 80.

Inboard pillow block 82 is structurally coupled to an inboard tip rib 90. Similarly, outboard pillow block 84 is structurally coupled to an outboard tip rib 92. Inboard tip rib 90 and outboard tip rib 92 are structural members of the airframe of tiltrotor aircraft 10. In the illustrated embodiment, the inboard pedestal includes an inboard intermediate support 94 that is utilized as a structural element between inboard pillow block 82 and inboard tip rib 90. Likewise, the outboard pedestal includes an outboard intermediate support 96 that is utilized as a structural element between outboard pillow block 84 and outboard tip rib 92. It should be appreciated that the exact structural configuration is implementation specific, and that structural components can be combined and/or separated to meet implementation specific requirements. For example, in certain implementations, airframe structures such as tip ribs 90, 92 may extend above wing 18 and form a portion the inboard and outboard pedestals.

Pylon assembly 24a is generally centered between inboard tip rib 90 and outboard tip rib 92. One advantage of locating pylon assembly 24a above the surface of upper wing skin 98 is that the fore/aft location of pylon assembly 24a can be easily tailored to align the aircraft center of gravity (CG) with conversion axis 50 while pylon assembly 24a is in helicopter mode, while also aligning the aircraft center of gravity (CG) with the wing aerodynamic center of lift while pylon assembly 24a is in airplane mode. It is noted that the aircraft center of gravity (CG) shifts as pylon assembly 24a rotates between helicopter mode and airplane mode. As such, locating pylon assembly 24a above the wing allows the exact fore/aft location to be optimized, while also structurally attaching pylon assembly 24a to a portion of the airframe in the form of a torque box defined by forward wing spar 100, aft wing spar 54, inboard tip rib 90 and outboard tip rib 92.

The location of the spindle gearbox 44 provides an efficient structural support for enduring operational loads by being mounted within the structural torque box. For example, when aircraft 10 is in helicopter mode, torque about mast axis 78 is reacted by the torque box. It should be noted that location of spindle gearbox 44 positions mast axis 78, while in helicopter mode, inboard of outboard tip rib 92, outboard of inboard tip rib 90, forward of aft spar 54 and aft of forward spar 100, which allows the axis of the torque to be inside of the torque box structure, rather than cantilevered outside of the torque box structure. In contrast, a spindle gearbox location outside (such as outboard, forward or aft) would cause a moment that would increase operational loading, thus requiring heavier and less efficient structural support.

Aircraft 10 includes a vibration isolator assembly 150 connecting the pylon assembly 24a to wing 18 and fuselage 12. For example, vibration isolator assembly 150 may be positioned at one or both of ribs 90, 92. As further described below, for example with reference to FIG. 11, vibration isolator assembly 150 includes a vertical isolator 152 to isolate fuselage 12 from a harmonic frequency produced for example when aircraft 10 is in helicopter mode and a lateral isolator 154 to isolate fuselage 12 from a harmonic frequency produced for example when aircraft 10 is in airplane mode. In addition to isolating frequencies in two planes, isolator assembly 150 may isolate two or more harmonic frequencies.

Figure 9:
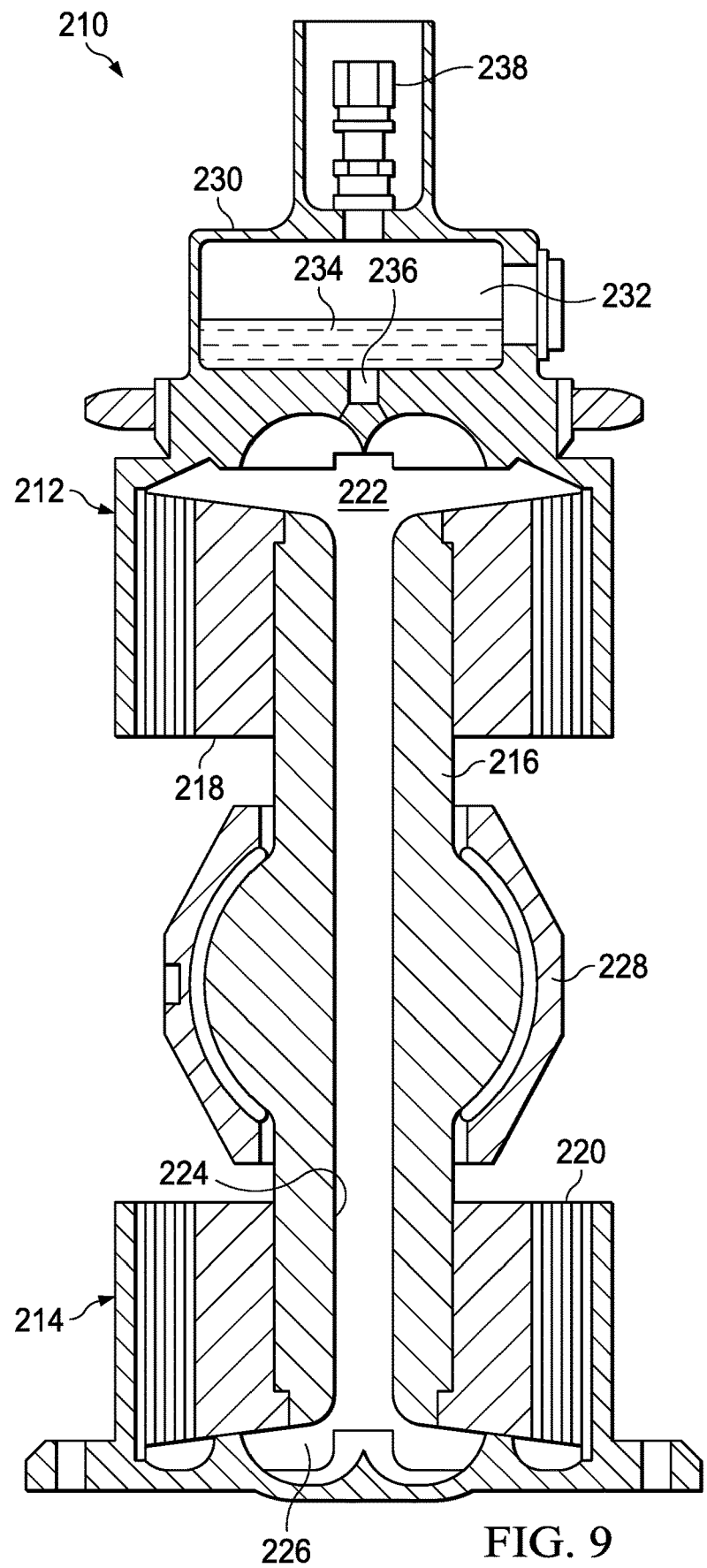
FIG. 9 illustrates an exemplary vibration isolator for isolating a frequency in a single direction.

FIG. 9 illustrates an example of a single vibration isolator 210 known as a liquid inertia vibration eliminator (LIVE). Vibration isolator 210 is configured to isolate vibration along a single axis. Vibration isolator 210 comprises an upper housing 212 and a lower outer housing 214. In this embodiment, upper housing 212 and lower housing 214 are not directly mechanically connected, but are connected indirectly via the other components of the device.

In addition to upper and lower housings 212 and 214, isolator 210 further comprises an inner cylinder 216 disposed within the volume defined by the concave portions of housings 212 and 214. In operation, inner cylinder 16 translates within this volume in reaction to motion imposed by a vibrating body.

Upper housing 212 is concentrically bonded to inner cylinder 216 by an elastomer tubeform bearing 218. Lower housing 214 is concentrically bonded to inner cylinder 216 by an elastomer tubeform bearing 220. The elastomer tubeform bearings 218 and 220 serve as compliant spring members for isolator 210. The length of the tubeform bearings can vary according to the demands of a particular application, but the length must be sufficient to minimize elastomer bulging caused by oscillatory pressure in the device.

The concave inner surface of upper housing 212 and the upper surfaces of inner cylinder 216 and tubeform bearing 218 together define an upper fluid chamber 222. Upper fluid chamber 222 is connected to the lower portions of isolator 210 via a tuning port 224 passing through inner cylinder 216. The concave inner surface of lower housing 214 and the lower surfaces of inner cylinder 216 and tubeform bearing 220 together define a lower fluid chamber 226, which is in fluid communication with the lower end of tuning port 224. In addition to serving as compliant spring members for isolator 210, elastomer tubeform bearings 218 and 220 serve as the fluid seals for fluid chambers 222 and 226.

Fluid chambers 222 and 226 and tuning port 224 are filled with an inviscid fluid 234 and pressurized to prevent cavitation. Isolator 210 incorporates a central elastomeric spherical bearing 228 in addition to the two elastomeric tubeform bearings 218 and 220.

In operation, upper and lower housings 212 and 214 are mounted to the body (e.g., wing rib, fuselage) to be isolated from vibration. Spherical bearing 228 is connected to the vibrating body (e.g., pylon assembly). As inner cylinder 216 moves within isolator 210, the volume of one of chambers 222 and 226 will increase as the other decreases. This change in volume creates a pressure differential between chambers 222 and 226 and a corresponding flow of inviscid fluid 234 from one chamber to another, in the opposite direction of movement of inner cylinder 216. This movement of fluid 234 causes an inertial force to be generated. Within a selected range of frequencies, this inertial force substantially or completely cancels out the elastomeric spring force in isolator 210.

In order to stabilize internal fluid pressures, fluid and elastomer thermal expansion is accommodated through the use of an integral volume compensator 230. Volume compensator 230 alleviates the accumulation of excessive pressure and the risk of cavitation that would otherwise exist due to volume changes caused by operation of the isolator across a broad range of temperatures. In the isolator shown in FIG. 9, compensator 230 takes the form of an air spring 232 filled with a gas such as nitrogen. In this design, the compensator does not require a barrier between gas 232 and fluid 234.

Isolator 210 communicates fluid pressure to the volume compensator 230 via a small diameter orifice 236. The size of orifice 236 is such that the pressure pulses caused by oscillation of inner cylinder 216 do not pass into volume compensator 230 in any significant degree. With this design, orifice 236 acts as a fluid pressure filter, transmitting static pressure changes into volume compensator 230 while at the same time blocking pressure oscillations. The ideal diameter for orifice 236 will vary with the viscosity of the fluid. One embodiment incorporates an orifice having a diameter of approximately 0.050".

Damping within isolator 210 is minimized through the use of elastomer bearings 218 and 220 having low damping characteristics and through the use of an inviscid fluid 234 within the device. Damping is additionally minimized through the use of a tuning port 224 having a relatively large value. A large diameter tuning port 224 reduces damping in isolator 210 by minimizing the velocity of fluid 234 within tuning port 224.

Fluid 234 used may vary from one embodiment to another, but it is desirable that the fluid 234 have a low viscosity and be noncorrosive. Other embodiments may incorporate mercury or hydraulic fluid having dense particulate matter suspended therein. Additionally, the mass of the fluid may in some embodiments be supplemented by the use of a solid slug disposed in tuning port 224.

Figure 10:
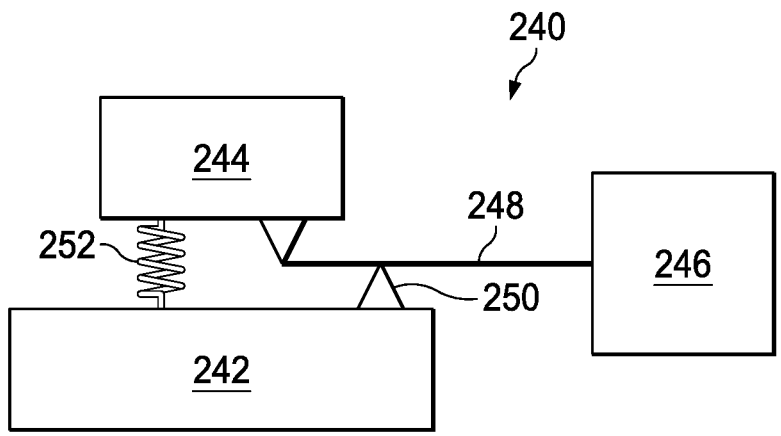
FIG. 10 is a schematic illustration of a spring-mass system representative of the operation of a vibration isolator.

FIG. 10 depicts a schematic illustration of an isolator system 240. System 240 comprises a fuselage mass 242, a pylon mass 244, and a tuning mass 246 connected by a lever arm 248 and a spring 252. Pylon mass 244 moves in response to an imposed oscillation and must be connected to fuselage mass 242, but it is desirable to isolate fuselage mass 242 from the vibration of pylon mass 244.

Tuning mass 246 and spring 252 have been added to the system to provide isolation. The displacement of spring 252 is a direct function of the difference in displacement between fuselage mass 242 and pylon mass 244. The displacement of tuning mass 246 is a function of the displacement of fuselage mass 242, the displacement of pylon mass 244, the length of lever arm 248, and the position of fulcrum 250. It can be seen in FIG. 9 that a small displacement of pylon mass 244 will result in a relatively large displacement of tuning mass 246.

In isolator 210 of FIG. 9, tuning mass 246 takes the form of inviscid fluid 234 filling isolator 210, which is moved by actuation of inner cylinder 216. The function represented by lever arm 248 is embodied in isolator 210 in the form of the difference between the area of the ends of cylinder 216 and the area of tuning port 224. It can be seen in FIG. 9 that, owing to the relatively large cross-sectional area of inner cylinder 216 as compared to tuning port 224, a small displacement of inner cylinder 216 will result in the movement of a relatively large volume of tuning fluid. The function of spring 252 takes the form of elastomeric tubeform bearings 218 and 220 in isolator 210.

Figure 11:
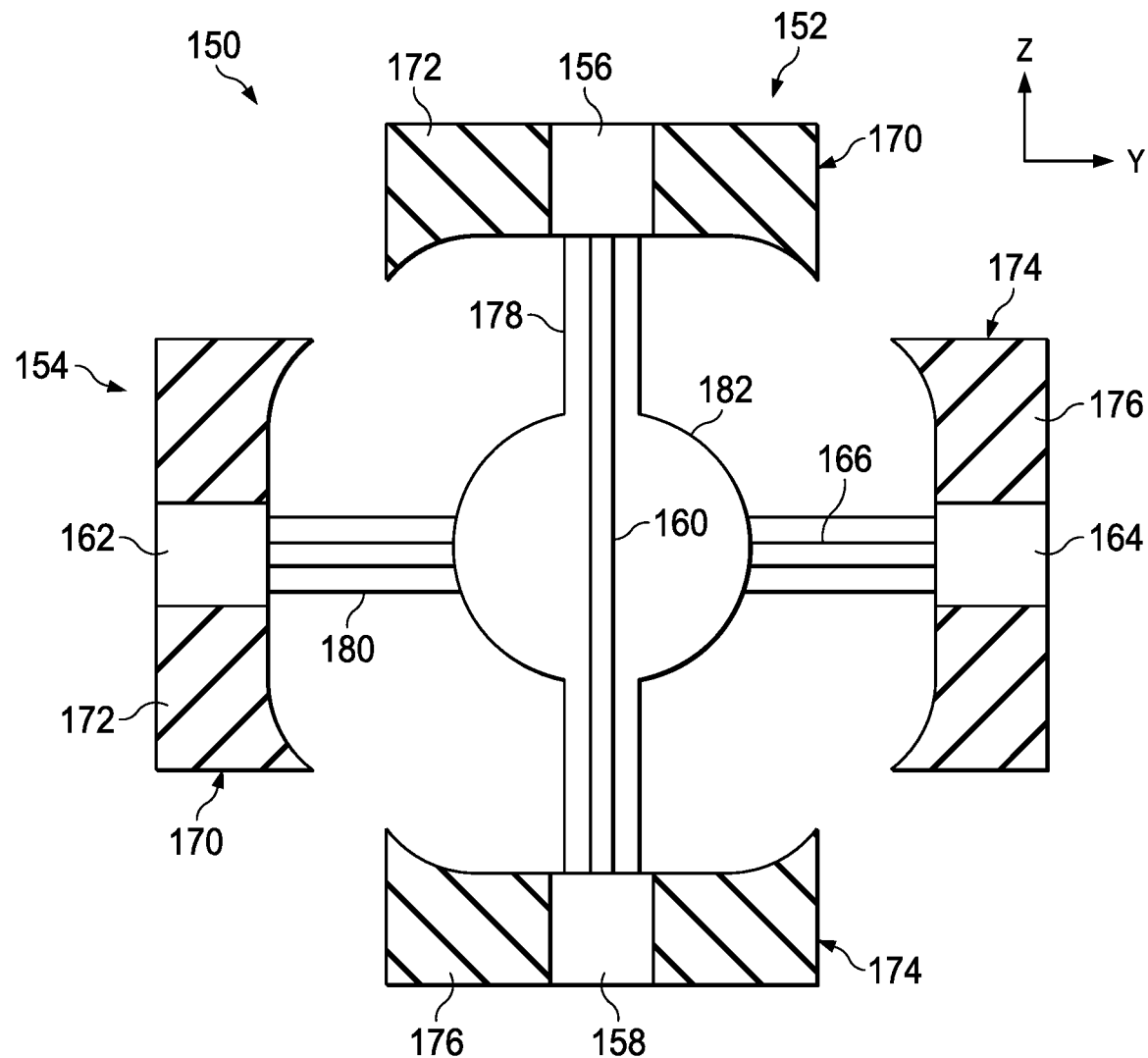
FIG. 11 is a schematic illustration of an exemplary vibration isolation assembly having a vertical plane isolator and a lateral plane isolator.

FIG. 11 schematically illustrates an exemplary vibration isolator assembly 150, which is described with additional reference to FIGS. 1-10. Vibration isolator assembly 150 comprises a pair of vibration isolators 152, 154 arranged to isolate vibrations in two planes for effective utilization in airplane mode and helicopter mode. Vibration isolator 152 is oriented along the vertical Z-axis (roll axis) for example to isolate the fuselage from the harmonic vibrations produced when the tiltrotor aircraft is in helicopter mode. Isolator 154 is oriented along the lateral Y-axis (pitch axis) for example to isolate the fuselage from the harmonic vibrations produced when the tiltrotor aircraft is in airplane mode. Isolators 15, 154 are liquid inertia vibration eliminators. Vertical vibration isolator 152 and lateral vibration isolator may be tuned to isolate the same frequency or different frequencies.

Isolator 152 includes a first housing 170 having a fluid chamber 156 and an elastomer 172 and a second housing 174 having a fluid chamber 158 and an elastomer 176. Fluid chambers 156, 158 are fluidically connected by tuning port 160 extending through a cylinder 178. Tuning port 160 extends through a cylinder 178. Isolator 154 similarly includes a first housing 170 having a fluid chamber 162 and an elastomer 172 and a second housing 174 having a fluid chamber 164 and an elastomer 176. Fluid chambers 162, 164 are fluidically connected by tuning port 166 extending through a cylinder 180. In the illustrated embodiment, isolator 152 and isolator 154 incorporate a common spherical bearing 182. Spherical bearing 182 is connected to the vibrating pylon assembly 24a and the housings 170, 174 of the respective isolators 152, 154 are connected to isolated body, e.g., fuselage 12.

In accordance to an embodiment, the isolated frequency for isolator 152 and isolator 154 are different to address the different harmonic frequencies of concern when operating in helicopter mode and airplane mode. For example, the proprotors are operated at higher revolutions per minute (RPM) when in helicopter mode than when operated in airplane mode. For example, in helicopter mode the aircraft may operate at 100% RPM and in airplane mode the aircraft may operate at 80% RPM, thus the harmonics shift by 20%. For example, in a 3-bladed proprotor assembly, a relatively strong vibration occurs three times per revolution (3/rev) of the proprotor. In helicopter mode a vertical vibration occurs and in airplane mode a lateral vibration occurs. The aircraft operates at a substantially constant rotor speed in each of the flight modes, so the frequency of the dominant harmonic can be accurately predicted and suppressed for helicopter mode by vertical isolator 152 and for airplane mode by lateral isolator 154.

Figure 12:
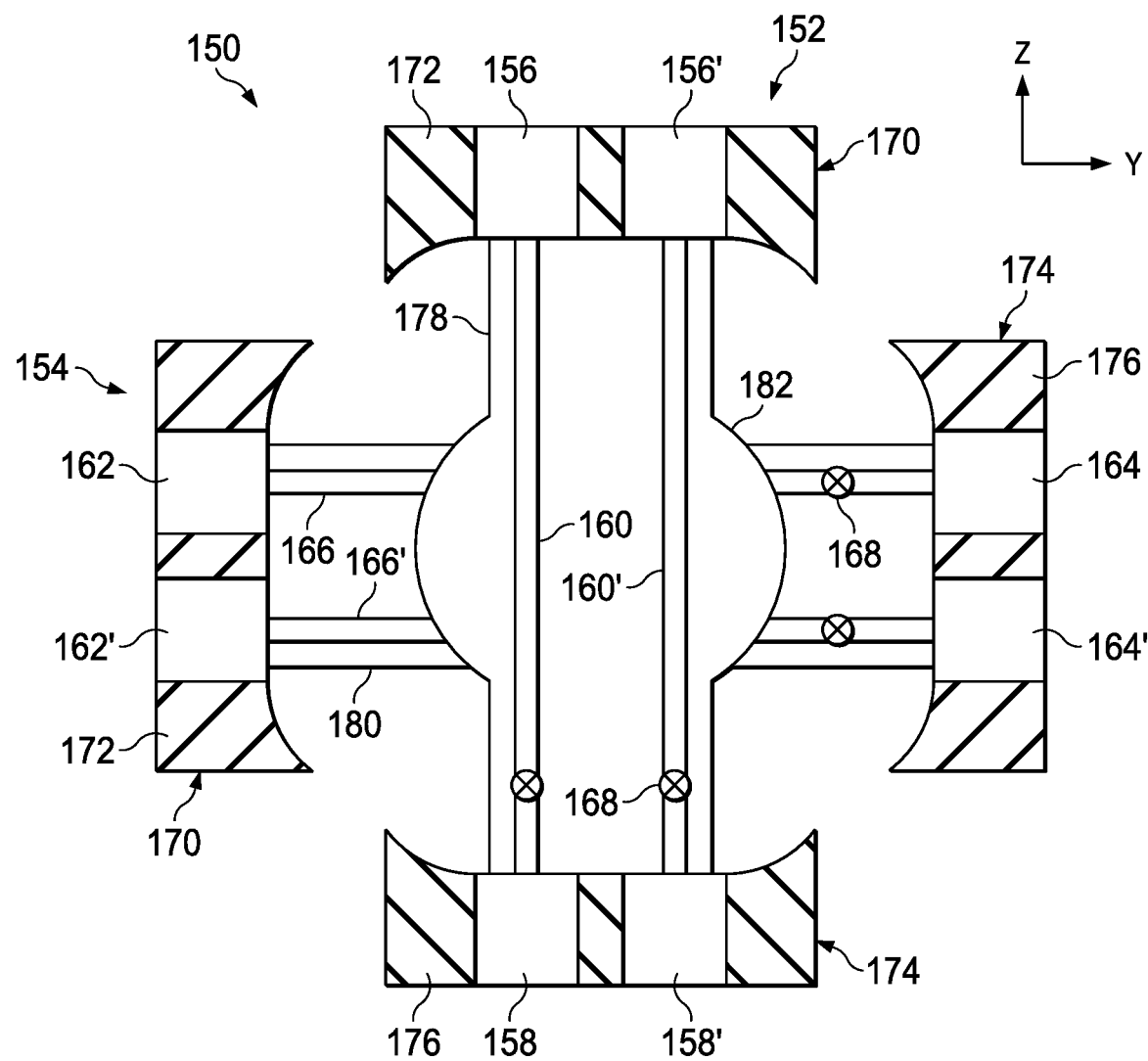
FIG. 12 is a schematic illustration of an exemplary vibration isolation assembly having a vertical plane isolator and a lateral plane isolator and multiple harmonic isolation capabilities.

FIG. 12 schematically illustrates another exemplary vibration isolator assembly 150, which is described with additional reference to FIGS. 1-11. In this example, each of vibration isolators 152, 154 have dual fluid chambers, for example with an actuated port, to change the tuning from a single frequency isolated to having dual frequency isolation capabilities. Vertical isolator 152 includes first chambers 156, 158 connected by first port 160 and second chambers 156', 158' connected by second port 160'. First chambers 156, 158 may be sized and actuated to isolate a first frequency and second chambers 156', 158' may be sized and actuated to isolate a second frequency different from the first frequency. Lateral isolator 154 includes first chambers 162, 164 connected by first port 166 and second chambers 162', 164' connected by second port 166'. First chambers 162, 164 may be sized and actuated to isolate a first frequency and second chambers 162', 164' may be sized and actuated to isolate a second frequency different from the first frequency. Tuning ports 160, 160', 166, and 166' may each include an actuator 168 to allow selective operation of the respective port and connected fluid chambers.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A vibration isolator assembly for connecting a first body and a second body, the vibration isolator assembly comprising:
    a first liquid inertial vibration isolator configured to isolate vibration in a first plane, the first vibration isolator comprising a first cylinder extending between first outer housings;
    a second liquid inertial vibration isolator configured to isolate vibration in a second plane, the second vibration isolator comprising a second cylinder extending between second outer housings; and
    a spherical bearing connected to the first and the second cylinders at an intersection of the first and the second cylinders.

2. The vibration isolator assembly of claim 1, wherein the first outer housings are connected to the first cylinder by first tubeform bearings; and
    the second outer housing are connected to the second cylinder by second tubeform bearings.

3. The vibration isolator assembly of claim 2, wherein the first liquid inertial vibration isolator is selectively tuned to eliminate a first frequency and a second frequency different from the first frequency; and
    the second liquid inertial vibration isolator is selectively tuned to eliminate a third frequency and a fourth frequency different from the third frequency.

4. The vibration isolator assembly of claim 3, wherein the first frequency and the third frequency are substantially equivalent.

5. The vibration isolator assembly of claim 2, wherein the first vibration isolator is tuned to eliminate a first frequency; and the second vibration isolator is tuned to eliminate a second frequency.

6. The vibration isolator assembly of claim 1, wherein the first liquid inertial vibration isolator comprises a first port extending through the first cylinder between first fluid chambers located in the first outer housings and a second port extending through the first cylinder between second fluid chambers located in the first outer housings;

the second liquid inertial vibration isolator comprises a third port extending through the second cylinder between third fluid chambers located in the second outer housings and a fourth port extending through the second cylinder between fourth fluid chambers located in the second outer housings.

7. The vibration isolator assembly of claim 6, wherein the first port comprises a first actuator operable for selective operation of the first port;

the second port comprises a second actuator operable for selective operation of the second port;

the third port comprises a third actuator operable for selective operation of the third port; and the fourth port comprises a fourth actuator operable for selective operation of the fourth port.

8. The vibration isolator assembly of claim 6, wherein the first outer housings are connected to the first cylinder by first tubeform bearings; and the second outer housing are connected to the second cylinder by second tubeform bearings.

9. The vibration isolator assembly of claim 1, wherein the first liquid inertial vibration isolator is selectively tuned to eliminate a first frequency and a second frequency different from the first frequency; and the second liquid inertial vibration isolator is selectively tuned to eliminate a third frequency and a fourth frequency different from the third frequency.

10. The vibration isolator assembly of claim 9, wherein the first frequency and the third frequency are substantially equivalent.

11. The vibration isolator assembly of claim 1, wherein the first vibration isolator is tuned to eliminate a first frequency; and the second vibration isolator is tuned to eliminate a second frequency.

12. A tiltrotor aircraft comprising:
a fuselage carrying a wing;
a pylon assembly coupled to the wing such that the pylon assembly is rotatable to selectively operate the tiltrotor aircraft between a helicopter mode and an airplane mode;
a liquid inertial vibration isolator assembly having a spherical bearing connected to the pylon assembly and outer housings mounted to the wing, the vibration isolator assembly comprising:
a first vibration isolator configured to isolate vibration in a vertical plane, the first vibration isolator having a first cylinder extending along the vertical plane between first outer housings of the outer housings;

a second vibration isolator configured to isolate vibration in a lateral plane, the second vibration isolator having a second cylinder extending along the lateral plane between second outer housings of the outer housings; and the spherical bearing connected to the first cylinder and the second cylinder at an intersection of the first cylinder and the second cylinder.

13. The tiltrotor aircraft of claim 12, wherein the first outer housings are connected to the first cylinder by first tubeform bearings; and the second outer housing are connected to the second cylinder by second tubeform bearings.

14. The tiltrotor aircraft of claim 13, wherein the first vibration isolator is selectively tuned to eliminate a first frequency and a second frequency different from the first frequency; and the second vibration isolator is selectively tuned to eliminate a third frequency and a fourth frequency different from the third frequency.

15. The tiltrotor aircraft of claim 12, wherein the first vibration isolator comprises a first port extending through the first cylinder between first fluid chambers located in the first outer housings and a second port extending through the first cylinder between second fluid chambers located in the first outer housings;

the first port comprises a first actuator operable for selective operation of the first port;

the second port comprises a second actuator operable for selective operation of the second port;

the second vibration isolator comprises a third port extending through the second cylinder between third fluid chambers located in the second outer housings and a fourth port extending through the second cylinder between fourth fluid chambers located in the second outer housings;

the third port comprises a third actuator operable for selective operation of the third port; and the fourth port comprises a fourth actuator operable for selective operation of the fourth port.

16. The tiltrotor aircraft of claim 15, wherein the first outer housings are connected to the first cylinder by first tubeform bearings; and the second outer housing are connected to the second cylinder by second tubeform bearings.

17. The tiltrotor aircraft of claim 12, wherein
the first vibration isolator is tuned to eliminate a first frequency; and the second vibration isolator is tuned to eliminate a second frequency.

18. The tiltrotor aircraft of claim 12, wherein the first vibration isolator is selectively tuned to eliminate a first frequency and a second frequency different from the first frequency; and the second vibration isolator is selectively tuned to eliminate a third frequency and a fourth frequency different from the third frequency.

* * * * *